Patented Apr. 11, 1933

1,903,712

UNITED STATES PATENT OFFICE

JOHANN HERMANN ABBINK SPAINK, OF WEST SMETHWICK, ENGLAND, ASSIGNOR TO CHANCE BROTHERS AND CO. LIMITED, OF WEST SMETHWICK, ENGLAND

AUTOMATIC ELECTRIC CURRENT GENERATING APPARATUS

Application filed October 29, 1931, Serial No. 571,915, and in Great Britain November 4, 1930.

This invention relates to automatic apparatus for generating electric current, the apparatus being of the kind in which are employed in combination a prime mover, such as an internal combustion engine, a dynamo, a starting motor, a storage battery, or accumulator, and means responsive to a current in the distributing circuit for stopping and starting the prime mover. In connection with such apparatus it is already known to employ a storage battery for starting purposes only, the voltage of the battery being considerably smaller than that at which the distributing circuit normally operates. The object of the present invention is to provide an improved system enabling components of a simple and robust character to be conveniently employed.

The invention comprises the combination of a generator consisting of a pair of parts, one of which is adapted to serve as an engine starting motor and to supply current to a low voltage battery which is permanently connected to the distributing circuit and to the said part of the generator, the two generator parts being adapted to operate jointly for supplying current at a higher voltage than that of the battery to the distributing circuit, and means responsive to a current flowing in the distributing circuit for connecting the two parts of the generator to the said circuit and the low voltage part to the battery.

Figure 1:
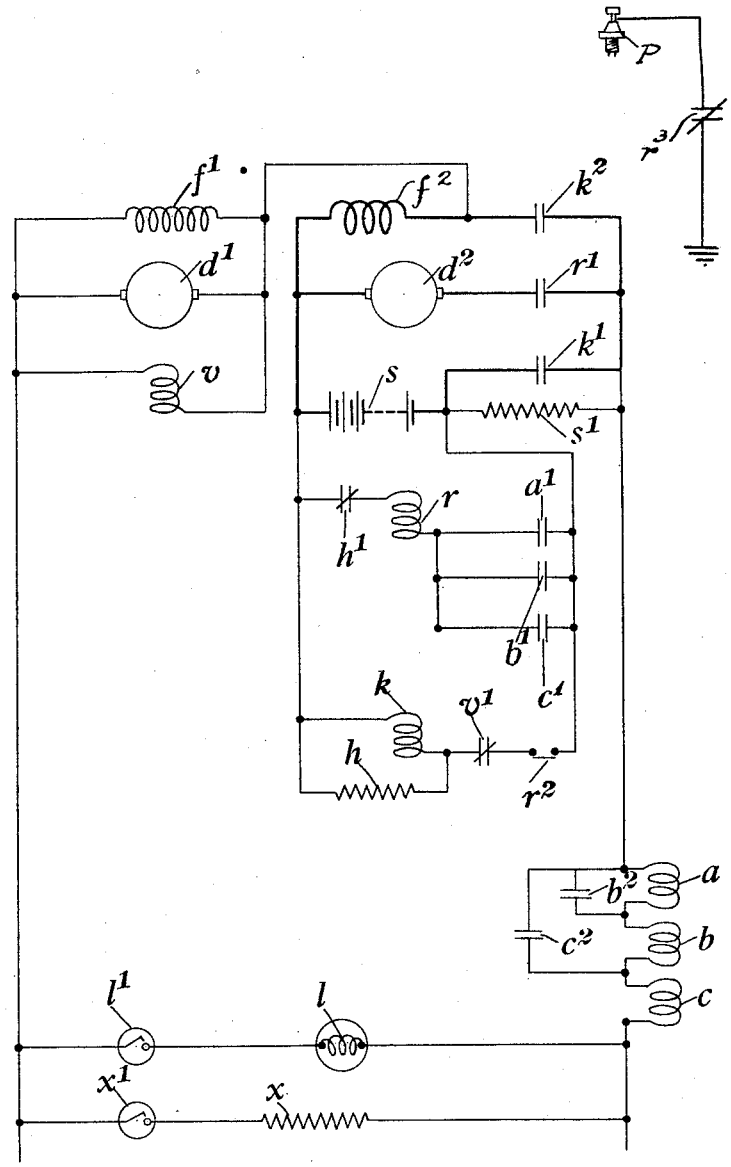
Figure 2:
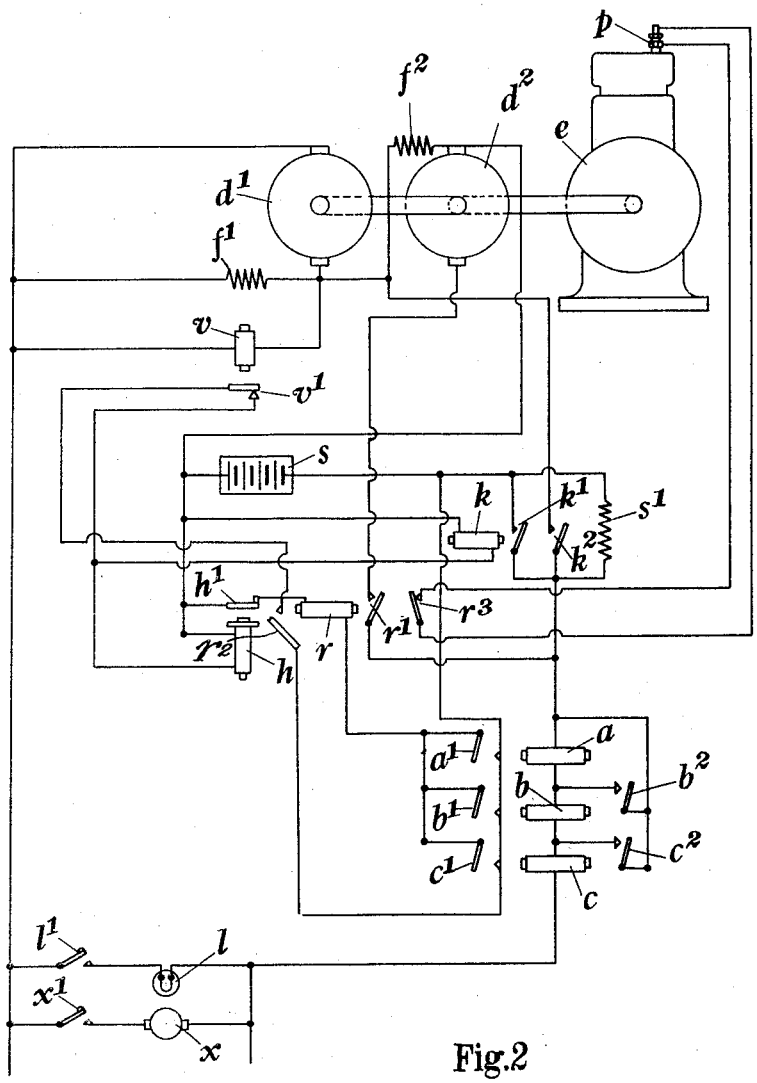

In the accompanying drawings: Figure 1 is a circuit diagram illustrating one mode of carrying the invention into effect; and Figure 2 is a schematic diagram showing the disposition of the various parts of the apparatus.

Referring to the diagrams, I may use two separate dynamo electric machines $d_1$ $d_2$ as the generator, these being mechanically coupled together, and arranged to operate in series. Or I may employ a suitably constructed single machine consisting of a pair of parts. One of the parts ($d_2$) is adapted to serve as a starting motor for starting the internal combustion engine $e$ (Figure 2) employed to drive the generator. This part also serves to supply charging current to the battery $s$. When the generator is supplying current to the distributing circuit both parts of the generator operate in conjunction with each other, the overall voltage of the combined parts being the normal working voltage of the distributing circuit.

The voltage of the battery is lower than that of the distributing circuit. In one convenient system the voltage of the battery is 24 and that of the distributing circuit is 110. Other voltages may, however, be employed. One end of the battery is permanently connected to the distributing circuit through a resistance $s_1$, and the other end is permanently connected to the side of the starting motor which lies between the two parts of the generator.

Between one side of the distributing circuit and one side of the armature of the machine $d_2$ is arranged a switch $r_1$, and between one side of the battery and the distributing circuit is arranged a switch $k_1$. Also a switch $k_2$ is arranged between the distributing circuit and the field winding $f_2$. The said winding operates as a shunt winding when $d_2$ acts as a motor, whereas when $d_2$ operates as a part of the generator $d_1$ $d_2$ the field winding is in series with the part $d_2$ and forms part of the compound-winding of the complete generator. The shunt field winding of the generator $d_1$ is indicated by $f_1$.

Associated with the battery is a local system of circuits arranged as indicated in the diagram. This system contains an electromagnet $r$ for operating the switch $r_1$. On one side of $r$ is arranged a switch $h_1$ which is normally closed and on the other side are a number of switches indicated by $a_1$, $b_1$, $c_1$. In the same system is an electromagnet $k$ associated with a switch $v_1$ (normally closed) and a switch $r_2$. Also across the ends of the magnet $k$ is connected a heating coil $h$ which serves to actuate a thermally responsive device for opening and closing the switch $h_1$. At the high voltage side of the generator is an electromagnet $v$ which serves to open the switch $v_1$.

Referring now to the distributing circuit, one side of it contains three electromagnets or relays $a$, $b$, $c$ in series. These control the switches $a_1$, $b_1$, $c_1$. I find it more convenient to employ a plurality of relays of different sensitiveness than a single relay. In the arrangement shown, $a$ will respond to a smaller current than $b$, and $b$ to a smaller current than $c$. When a heavier current flows in the distributing circuit than can be safely carried by $a$, the magnet $b$ closes a switch $b_2$ and so cuts out $a$. When the current is heavier than can be varied safely by $b_1$ the coil $c$ closes a switch $c_2$ and so cuts out $b$. The coil $c$ can carry the full current for which the distributing circuit is designed. The circuit conveys current to lamps, one of which is indicated by $l$ (controlled by a switch $l_1$) and to other electrically operated appliances, such as heating apparatus or small motors, one of which is indicated by $x$ (controlled by a switch $x_1$.)

Assuming the engine and generator to be at rest, no current then flows in any part of the system. On closing a lamp switch ($l_1$), or other switch $x_1$, current will flow through the circuit containing the battery $s$ and the parts $s_1$, $a$, $b$, $c$, $l$, $l_1$, (or $x$, $x_1$) $d_1$, $f_1$ and $f_2$. This current will be sufficient to cause $a$ or $b$ or $c$ to close $a_1$ or $b_1$ or $c_1$. Now current can flow from the battery through $r$ which closes $r_1$ $r_2$. The closing of $r_2$ enables $k$ to close $k_1$ $k_2$. A heavy current now passes from the battery to $d_2$ $f_2$ and operates the low voltage part of the generator as a motor for starting the engine $e$.

If the engine through any defect fails to respond in a predetermined time, the heater $h$ opens the switch $h_1$ which cannot be reclosed except by hand. Consequently the battery is disconnected and emptying of the battery is prevented. It will readily be understood that any other time lag device may be used to open the switch $h_1$ if the engine fails to start promptly. Normally the engine starts immediately and drives the generator $d_1$ $d_2$. As soon as the normal working voltage of the system is reached, the magnet $v$ opens the switch $v_1$ and cuts out the switches $k_1$, $k_2$ causing the field winding $f_2$ to operate in series with $d_2$. The switch $r_1$ however remains in action, and a charging current is delivered to the battery $s$ by the part $d_2$ through the resistance $s_1$.

When a heavier current flows in the system than can be safely carried by $a$, either before starting or afterwards, the magnet $b$ cuts out $a$ and causes the switch $a_1$ to open. Likewise if the current exceeds that which $b$ can withstand, the magnet $c$ cuts out $b$ and opens the switch $b_1$. When there is no demand for current in the distributing system, all of the switches as $l_1$ $x_1$ being open, the consequent de-energizing of $a$, $b$ or $c$ causes $r$ to be de-energized and the switches $r_1$ $r_2$ to be opened. The coil $r$ also controls a switch $r_3$ which puts out of action the ignition apparatus $p$ of the engine and so stops the engine, the said switch being operated by the coil $r$ in the reverse direction when it is required to start the engine. Instead of controlling an ignition switch the part $r$ may operate any other convenient means for controlling the stopping and starting of the engine.

In systems arranged in accordance with my invention, the battery is in permanent connection with the distributing circuit, and the starting motor forms part of the current generator.

The invention is not limited to the example above described and subordinate details can be varied to suit different requirements.

Having thus described my invention, what I claim as new and desire to secure by Letters Patent is:—

1. In automatic electric current generating apparatus of the kind specified, the combination of a generator consisting of a pair of parts, one of which is adapted to serve as an engine starting motor and to supply current to a low voltage battery which is permanently connected to the distributing circuit and to the said part of the generator, the two generator parts being adapted to operate jointly for supplying current at a higher voltage than that of the battery to the distributing circuit, and means responsive to a current flowing in the distributing circuit for connecting the two parts of the generator to the said circuit and the low voltage part to the battery, substantially as described.

2. In automatic electric current generating apparatus as claimed in claim 1, the combination with the two part generator, of a compound field winding, the series portion of which serves as a shunt field winding for the low voltage part when the latter acts as an engine starting motor, and a switch for connecting one end of the said portion of the field winding to a part of the distributing circuit which is permanently connected to one end of the battery, substantially as described.

3. In automatic electric current generating apparatus as claimed in claim 1, the combination with the two part generator, of a compound field winding, the series portion of which serves as a shunt field winding for the low voltage part when the latter acts as an engine starting motor, and a switch for connecting one end of the said portion of the field winding to a part of the distributing circuit which is permanently connected to one end of the battery, said means comprising a pair of switches which respectively connect one side of the said generator part and one end of the battery to the adjacent portion of the distributing circuit, substantially as described.

4. In automatic electric current generating apparatus of the kind specified, the combination of a generator consisting of a pair of parts, one of which is adapted to serve as an engine starting motor and to supply current to a low-voltage battery which is permanently connected to the distributing circuit and to the said part of the generator, the two generator parts being adapted to operate jointly for supplying current at a higher voltage than that of the battery to the distributing circuit, and means responsive to a current flowing in the distributing circuit for connecting the two parts of the generator to the said circuit and the low-voltage part to the battery, comprising a pair of switches which respectively connect one side of the said generator part and one end of the battery to the adjacent portion of the distributing circuit, substantially as described.

5. In automatic electric current generating apparatus as claimed in claim 4, the combination with the battery, of local circuits containing electromagnets and switches responsive to relays in the distributing circuit for actuating the switches associated with the low-voltage part of the generator, substantially as described.

6. In automatic electric current generating apparatus of the kind specified, the combination of a generator consisting of a pair of parts, one of which is adapted to serve as an engine starting motor and to supply current to a low-voltage battery which is permanently connected to the distributing circuit and to said part of the generator, the two generator parts being adapted to operate jointly for supplying current at a higher voltage than that of the battery to the distributing circuit, means comprising relays responsive to a current in the distributing circuit for connecting the two parts of the generator to said circuit and the low voltage part to the battery, and local circuits for said battery containing electromagnets and switches responsive to said relays in the distributing circuit for actuating switches associated with the low-voltage part of the generator.

7. In automatic electric current generating apparatus as claimed in claim 6, the combination with the high voltage part of the generator, of an electromagnet for controlling a switch in one of the local circuits connected with the battery substantially as and for the purpose described.

8. In automatic electric current generating apparatus as claimed in claim 6, the combination with the local circuits associated with the battery, of a thermal or other time lag device for opening a switch in one of the said circuits in the event of the engine failing to start promptly, substantially as described.

In testimony whereof I have signed my name to this specification.

JOHANN HERMANN ABBINK SPAINK.